US009330171B1

(12) United States Patent
Shetty et al.

(10) Patent No.: US 9,330,171 B1
(45) Date of Patent: May 3, 2016

(54) VIDEO ANNOTATION USING DEEP NETWORK ARCHITECTURES

(71) Applicant: Google Inc., Mountain View, CA (US)

(72) Inventors: Sanketh Shetty, Sunnyvale, CA (US); Andrej Karpathy, Stanford, CA (US); George Dan Toderici, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 12 days.

(21) Appl. No.: 14/161,146

(22) Filed: Jan. 22, 2014

Related U.S. Application Data

(60) Provisional application No. 61/892,408, filed on Oct. 17, 2013.

(51) Int. Cl.
*G06K 9/64* (2006.01)
*G06F 17/30* (2006.01)
*G06T 3/00* (2006.01)

(52) U.S. Cl.
CPC .... *G06F 17/30784* (2013.01); *G06F 17/30247* (2013.01); *G06K 9/64* (2013.01); *G06T 3/00* (2013.01)

(58) Field of Classification Search
CPC .. G03B 21/00; G03B 21/2046; G09G 3/3413; G09G 2320/062; G09G 2320/106; G09G 2360/16; G06K 9/00711; G06K 9/527; G06K 9/00; G06K 9/78; H04N 5/23216; H04N 9/3102; H04N 9/3179; H04N 21/23412; H04N 21/858; H04N 13/0048; H04N 5/147; H04N 19/159; H04N 19/176; H04N 19/88; G06F 17/10; G06F 17/30811; G06F 17/30026; G06F 3/002; G06F 3/1431; G06F 3/1438; G06F 17/30843; G06T 2207/10012; G06T 7/0075; G06T 3/4069; G10L 15/24; G10L 15/00; H05B 37/0236; A63F 13/00; H04L 65/607
USPC .......... 382/100, 195, 197, 232, 236, 279, 305
See application file for complete search history.

(56) References Cited

U.S. PATENT DOCUMENTS

| 5,963,203 A | * | 10/1999 | Goldberg | ............ G06F 17/3079 707/E17.028 |
| 6,148,028 A | * | 11/2000 | Kikuchi | ................... H04N 7/52 375/240 |

(Continued)

OTHER PUBLICATIONS

Le, Quoc V.; Zhou, Will Y.; Yeung, Serena Y.; and Ng, Andrew Y., "Learning Hierarchical Invariant Spatio-temporal Features for Action Recognition with Independent Subspace Analysis", Computer Science Department and Department of Electrical Engineering, Stanford University, CVPR, 2011, pp. 3361-3368.

(Continued)

*Primary Examiner* — Vu Le
*Assistant Examiner* — Aklilu Woldemariam
(74) *Attorney, Agent, or Firm* — Lowenstein Sandler LLP

(57) ABSTRACT

A method includes receiving, by a processing device of a content sharing platform, a video content, selecting at least one video frame from the video content, subsampling the at least one video frame to generate a first representation of the at least one video frame, selecting a sub-region of the at least one video frame to generate a second representation of the at least one video frame, and applying a convolutional neuron network to the first and second representations of the at least one video frame to generate an annotation for the video content.

18 Claims, 11 Drawing Sheets

(56) References Cited

U.S. PATENT DOCUMENTS

| | | | | |
|---|---|---|---|---|
| 6,535,639 B1* | 3/2003 | Uchihachi | G06F 17/30799 | 341/79 |
| 6,573,907 B1* | 6/2003 | Madrane | G06F 17/30787 | 707/E17.028 |
| 6,901,110 B1* | 5/2005 | Tsougarakis | G06T 7/2013 | 348/E5.066 |
| 7,352,905 B2* | 4/2008 | Mukerjee | H04N 19/52 | 375/E7.125 |
| 8,027,542 B2* | 9/2011 | Ahammad | G06F 17/30781 | 348/699 |
| 8,073,055 B2* | 12/2011 | De Haan | H04N 19/169 | 375/240.16 |
| 8,548,192 B2* | 10/2013 | Zhang | G06K 9/00744 | 375/240 |
| 2002/0135618 A1* | 9/2002 | Maes | G06F 3/0481 | 715/767 |
| 2003/0033347 A1* | 2/2003 | Bolle | G06F 17/30253 | 718/107 |
| 2004/0125877 A1* | 7/2004 | Chang | G06F 17/30787 | 375/240.28 |
| 2005/0053295 A1* | 3/2005 | Holcomb | H04N 19/70 | 382/236 |
| 2007/0028288 A1* | 2/2007 | Sigmon | G06F 17/30905 | 725/136 |
| 2008/0018784 A1* | 1/2008 | Bennett | H04N 5/44 | 348/439.1 |
| 2008/0060034 A1* | 3/2008 | Egnal | G01C 11/02 | 725/105 |
| 2008/0063287 A1* | 3/2008 | Klamer | H04N 5/44 | 348/439.1 |
| 2009/0174810 A1* | 7/2009 | Endo | G02B 26/0833 | 348/390.1 |
| 2011/0193897 A1* | 8/2011 | Park | G09G 3/003 | 345/691 |
| 2011/0216937 A1* | 9/2011 | Radhakrishnan | G06F 17/30799 | 382/100 |
| 2012/0023250 A1* | 1/2012 | Chen | H04N 21/234327 | 709/231 |
| 2012/0208592 A1* | 8/2012 | Davis | H04W 4/001 | 455/556.1 |
| 2012/0218256 A1* | 8/2012 | Murray | G06T 7/0075 | 345/419 |
| 2012/0294367 A1* | 11/2012 | Ziauddin | H04N 19/61 | 375/240.16 |
| 2013/0301727 A1* | 11/2013 | Huang | H04N 19/00587 | 375/240.16 |
| 2013/0330055 A1* | 12/2013 | Zimmermann | H04N 21/2743 | 386/240 |
| 2014/0023341 A1* | 1/2014 | Wang | H04N 9/87 | 386/240 |
| 2014/0037215 A1* | 2/2014 | Kumar | G06K 9/00718 | 382/197 |

OTHER PUBLICATIONS

Lecun, Yann; and Bengio, Yoshua, "Convolutional Networks for Images, Speech, and Time-Series", The Handbook of Brain Theory and Neural Networks, 1995, 3361:1-14.

\* cited by examiner

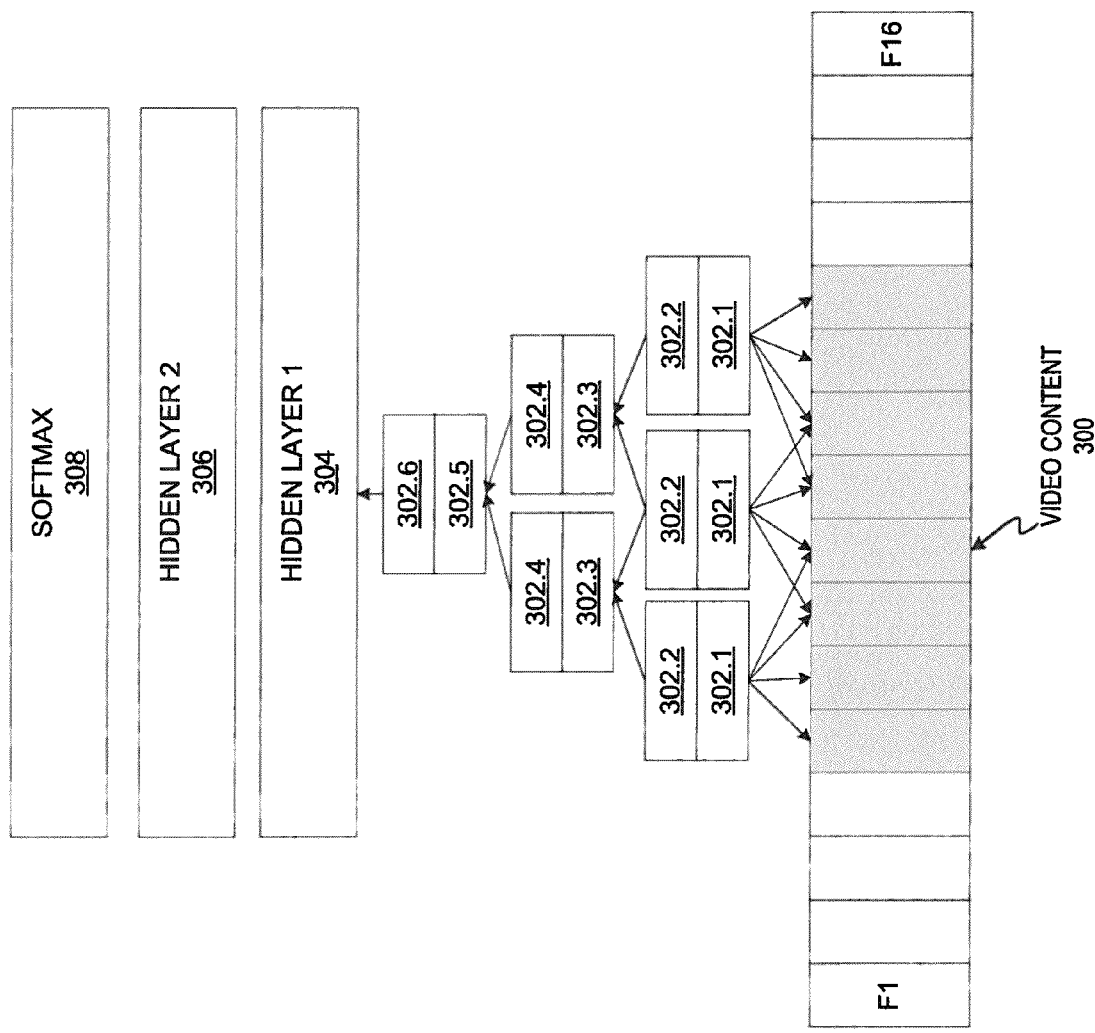

VIDEO ANNOTATION USING DEEP NETWORK ARCHITECTURES

RELATED APPLICATION

The present application claims priority from U.S. Provisional Patent Application No. 61/892,408, filed Oct. 17, 2013, the content of which is incorporated by reference in its entirety herein.

TECHNICAL FIELD

This disclosure relates to the field of video content sharing and, in particular, to annotate video contents based on video frames using a neuron network.

BACKGROUND

Large amounts of video content are made available on the Internet for users to browse and view. To search for a particular video clip, a user of the video content may enter one or more keywords as a query to a search engine to initiate a search process. The search engine may seek out video clips that match the request of the user based on certain criteria, and return to the user with a ranked list of video clips related to the query. One way to perform the search is to match the entered keywords with meta-data associated with each video clip. The meta-data may include the author, actors, and a short description of the video. However, not all video clips are associated with meta-data. Additionally, some video clips are associated with incomplete meta-data. For example, the meta-data of a video clip may just include the author, but may not provide textual description that may be helpful for the search. Thus, there is a significant amount of video content that needs to be annotated or associated with correct meta-data.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method that provides for receiving, by a processing device of a content sharing platform, a video content, selecting at least one video frame from the video content, subsampling the at least one video frame to generate a first representation of the at least one video frame, selecting a sub-region of the at least one video frame to generate a second representation of the at least one video frame, and applying a convolutional neuron network to the first and second representations of the at least one video frame to generate an annotation for the video content.

In one implementation, the method further provides that the first representation is a lower-resolution representation of the at least one video frame, and the second representation is a fovea representation that covers a smaller region than, but at a same spatial sampling rate as, the at least one video frame.

Implementations of the disclosure may include a machine-readable non-transitory storage medium storing instructions which, when executed, cause a processing device to perform operations including receiving a video content, selecting a plurality of video frames from the video content, applying a convolutional neuron network to the plurality of video frames to generate an annotation for the video content; and making the annotated video content available for search on a content sharing platform.

Implementation of the disclosure may include a system including a memory and a processor communicably coupled to the memory, the processor to execute content sharing platform. The processor receive a video content, select at least one video frame from the video content, subsample the at least one video frame to generate a first representation of the at least one video frame, select a sub-region of the at least one video frame to generate a second representation of the at least one video frame, and apply a convolutional neuron network to the first and second representations of the at least one video frame to generate an annotation for the video content.

BRIEF DESCRIPTION OF THE DRAWINGS

The present disclosure is illustrated by way of example, and not by way of limitation, in the figures of the accompanying drawings.

FIGS. 3A-3E are information fusion models using convolutional neuron network (CNN) according to implementations of the disclosure.

DETAILED DESCRIPTION

Figure 1:
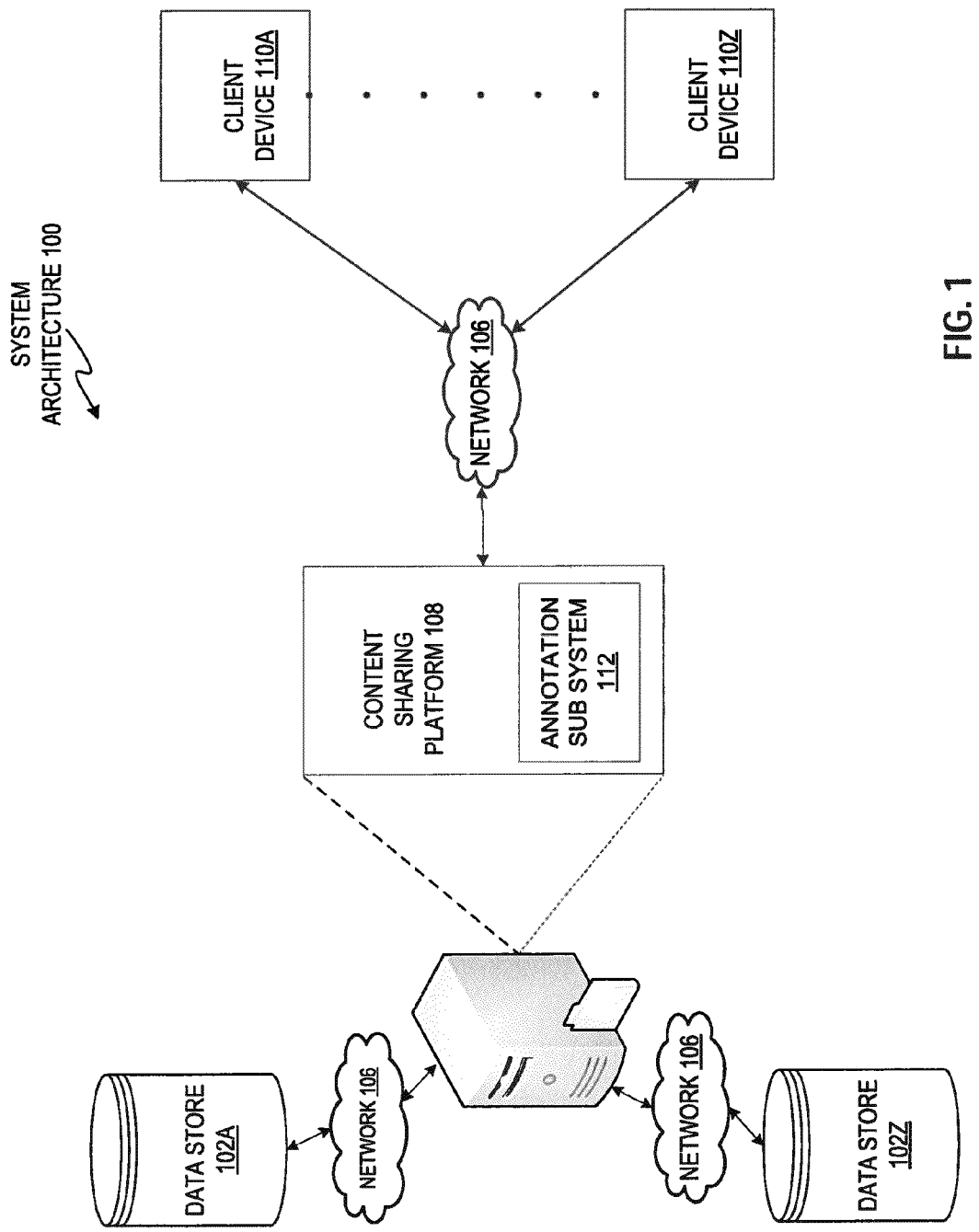
FIG. 1 illustrates a system architecture in which aspects of the present disclosure can be implemented.

A human observer may view a video clip and manually enter keyword annotations to create searchable meta-data for the video clip. Although manual annotation might be accurate, manual annotation of video is very expensive and is not fast enough to deal with the rapid growth of video content on the Internet. Therefore, there is a need for system and method that automatically derive meta-data containing descriptive annotations directly from video frames of video clips.

A video clip may include a stack of video frames (or images) each of which is to be displayed at a frame rate. For example, video frames may be played at 30 frames per second or at a higher rate. Each video frame may include a two-dimensional array of pixels, and each pixel may include pixel intensities. The pixel intensities may be grey levels for black and white video frames or color intensities (red, green, blue) for colored video frames. The number of pixels in a video frame denotes the resolution of the video frame, and the number of bits used for each pixel denotes the pixel depth or precision. Thus, a video clip may be represented by a volume of pixels in a three-dimensional space (x, y, t), in which x and y are the spatial coordinates, and t is the temporal axis. Implementations of the present disclosure include systems and methods that derive annotation keywords from the three-dimensional volume of pixels representing a video clip.

Implementations of the present disclosure include systems and methods that apply deep learning architectures directly on pixels of video frames to generate annotations. Compared to feature-based approaches where spatial and temporal features (e.g., edges) are first extracted from video frames, and then the extracted features are fed into a learning architecture, implementations of the present disclosure apply deep learning architecture directly to pixels of video frames without the intermediate feature extraction process, and achieve superior results than feature-based approaches.

Convolutional neuron network (CNN) is a type of deep learning architectures. A deep learning architecture refers to algorithms in machine learning that attempt to learn in multiple levels, corresponding to different levels of abstraction. CNN, as a type of deep learning architecture, is a feed-forward artificial neural network in which the individual neurons respond to overlapping regions in the visual field. CNN may include a filter layer, a pooling layer, and a connected neuron network.

The filter layer may include convolution operators that may convolve the input video frames VF(i, m, n, t) with a kernel K (i, m, n, t) or VF*K (i, m, n, t), where i represents pixel intensity index ($i_{max}$=1 for grey scale, and $i_{max}$=3 for colored), m and n are spatial indices, and t is the temporal index (or frame numbers). A kernel refers to the filter as applied to the video frames. In an implementation, the size of kernel K may be small compared to the size of the video frame to achieve compact computation. For example, for a video frame of 170×170×3×T, where T is a number representing total frames, the kernel may be 3×3×3×4. In an implementation, the filter layer may include a number of convolution operators that may convolve different kernels with the input to achieve different filtering results. The outcomes of the filter layer may be fed into a subsequent pooling layer or another filter layer.

The pooling layer may include average operators and max-pooling operators to down sample the input video frames to smaller sizes. The average operators may produce an average value within a particular range. In an implementation, the average operator may be a simple average of the pixel intensities within the particular range. In other implementations, the average operator may specify weights for each pixel and produce a weighted-average of the pixel intensities. Max-pooling operators may produce an outcome of the max intensity within a particular range. Like kernels used in filter layers, operators used in pooling layers may also be small compared to the size of video frames to achieve compact computation. For example, the average and/or pooling-max operator may be 3×2×2×3. The size of the pooling layer output may be smaller than that of its input, each data point of the output representing an averaged value of a sub-region of the input.

The input of a CNN may be subject to multiple filter layers and/or pooling layers prior to applying the neuron network layer to the filtered and pooled input. Each pooling layer may reduce the size of input to the pooling layer. Thus, after several layers of filtering and pooling, the input to the neuron network may be reduced to a small amount of data. The neuron network may be a fully-connected neuron network, including hidden layers of neurons that can compute values from inputs by feeding information through the network and a layer of softmax activation functions that calculate the layer's output from its net input in a manner similar to biologically plausible approximation to the maximum operation. Parameters of the fully-connected neuron network may be trained on labeled training data. In an implementation, the training data may be labeled manually. For example, human observers may view a set of video clips and manually create training meta-data including annotations to each video clips.

In an alternative embodiment, the training data may be labeled automatically to generate a large amount of training data. Unlike those feature-based neuron network approaches where spatial and temporal features (such as edges in the intensity images) in the training video frames are also labeled manually, the deep learning architectures as used in implementations are applied to the pixels directly. Because pixels do not need labeling, large amount of training data can be generated automatically from the large amount of video contents that are already in existence. For example, for action video such as "mountain biking," there are thousands of video clips that are annotated with the keyword "mountain biking" on different websites. These video clips may be converted into training data through processing steps such as cropping to a predetermined size and pixel intensity normalization. In this way, the training data may be easily generated for different classes of video clips and at very fine granularity of keywords.

FIG. 1 illustrates a system architecture 100 in which aspects of the disclosure can be implemented. The architecture 100 includes a plurality of data stores 102A-102Z, a network 106, a content sharing platform 108, and client devices 110A through 110Z. In an implementation, data stores 102A-102Z may be repositories of video contents that are accessible through network 106. Data stores may include multiple storage components (e.g., multiple drives or multiple databases) that may also span multiple computing devices (e.g., multiple server computers).

Content sharing platform may be connected to data stores 102A-102Z and/or client devices 110A-110Z via a network 106. Network 106 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data.

The client devices 110A through 110Z may each include computing devices such as personal computers (PCs), laptops, mobile phones, smart phones, tablet computers, netbook computers, etc. In some implementations, client device 110A through 110Z may also be referred to as "user devices." Each client device may include a media viewer (not shown). In one implementation, the media viewers may be applications that allow users to view content, such as images, videos, web pages, documents, etc. For example, the media viewer may be a web browser that can access, retrieve, present, and/or navigate content (e.g., web pages such as Hyper Text Markup Language (HTML) pages, digital media items, etc.) served by a web server. The media viewer may render, display, and/or present the content (e.g., a web page, a media viewer) to a user. The media viewer may also display an embedded media player (e.g., a Flash® player or an HTML5 player) that is embedded in a web page (e.g., a web page that may provide information about a product sold by an online merchant).

In another example, the media viewer may be a standalone application (e.g., a mobile app) that allows users to view digital media items (e.g., digital videos, digital images, electronic books, etc.).

The media viewers may be provided to the client devices 110A-110Z by content sharing platform 108. For example, the media viewers may be applications that are downloaded from the content sharing platform 108 or a third-party app store.

In general, functions described in one implementation as being performed by the content sharing platform 108 can also be performed on the client devices 110A-110Z in other implementations if appropriate. In addition, the functionality attributed to a particular component can be performed by different or multiple components operating together. The content sharing platform 108 can also be accessed as a service provided to other systems or devices through appropriate application programming interfaces, and thus is not limited to use in websites.

In one implementation, the content sharing platform 108 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 108 may allow a user to consume, upload, search for, approve of ("like"), dislike, and/or comment on media items. The content sharing platform 108 may also include a website (e.g., a webpage) that may be used to provide a user with access to the media items such as video contents.

A media item may be consumed via the Internet and/or via a mobile device application. For brevity and simplicity, an online video (also hereinafter referred to as a video) is used as an example of a media item throughout this document. As used herein, "media," media item," "online media item," "digital media," "digital media item," "content," and "content item" can include an electronic file that can be executed or loaded using software, firmware or hardware configured to present the digital media item to an entity. In one implementation, the content sharing platform 108 may store hyperlinks to the media items stored on the data stores 102A-102Z.

In one implementation, the content sharing platform 108 includes an annotation subsystem 112 that converts raw video content (e.g., content stored in data stores 102 and/or received from client devices 110) into annotated video content to facilitate video classification, video searching, ad targeting, spam and abuse detection, content rating, etc.

In situations in which the systems discussed herein collect personal information about users, or may make use of personal information, the users may be provided with an opportunity to control whether the content sharing platform 108 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 108.

Figure 2:
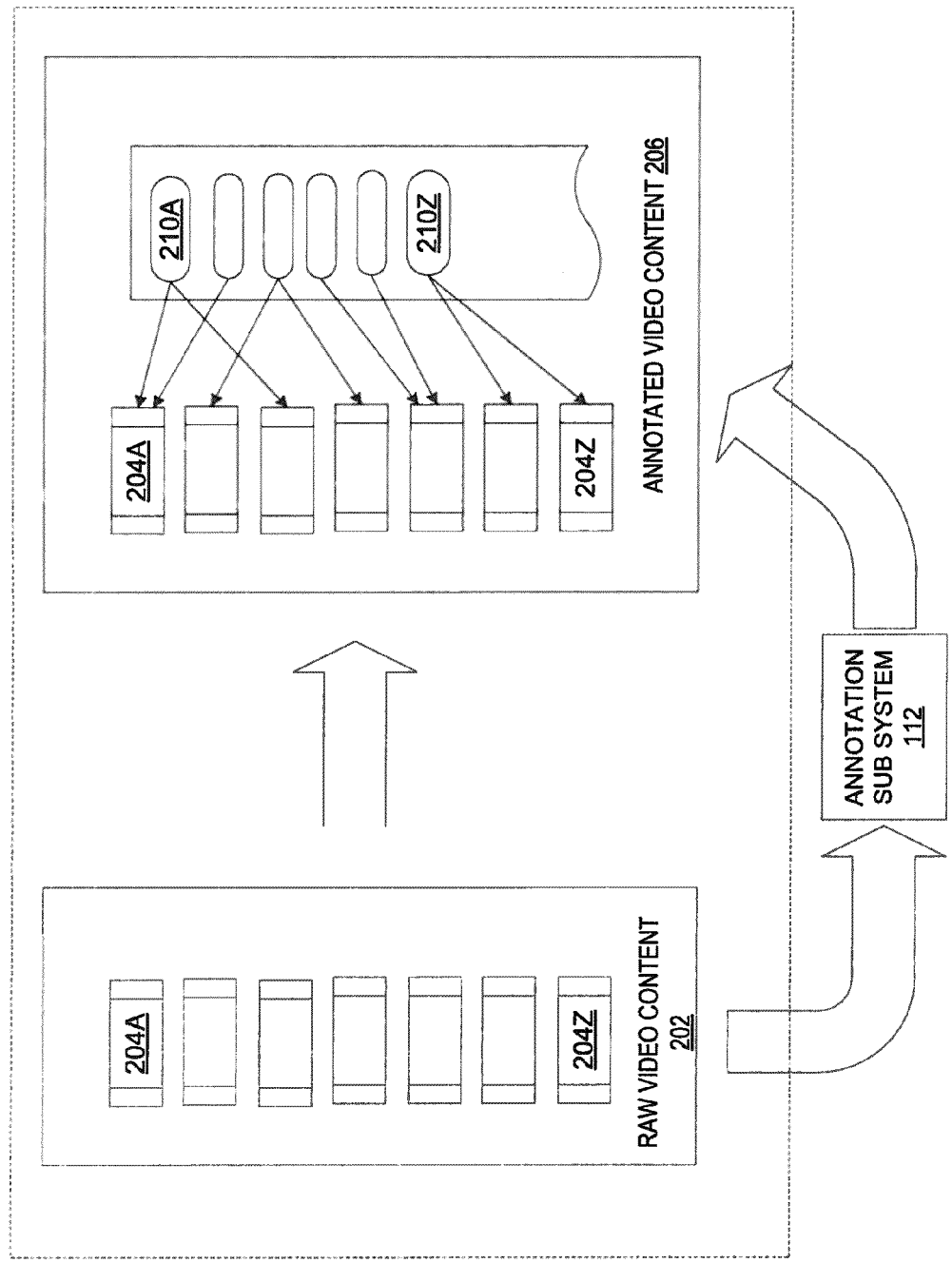
FIG. 2 illustrates operation of an annotation subsystem according to an implementation of the disclosure.

FIG. 2 illustrates operation of an annotation subsystem 112 according to an implementation of the disclosure. Annotation subsystem 112 may be a computer system 700 discussed in more detail below in conjunction with FIG. 7.

As shown in FIG. 2, raw video contents 202 may include hyperlinks 204A-204Z stored on the content sharing platform 108. Hyperlinks 204A-204Z may provide links to raw videos stored in data stores 102 over the network. These raw videos may not be associated with annotations in the form of metadata, or alternatively, the annotations associated these raw videos may need to be updated. Annotation subsystem 112 associates raw video contents (such as those without annotation keywords or tags) with annotations or updated annotations. In an implementation, the annotation subsystem 112 may retrieve whole, or part of, a video clip for processing. The annotation subsystem 112 then may analyze the video frames of the video clip and generate annotations for the video clip. The annotation subsystem 112 may generate annotations for each of the video clips on the content sharing platform 108 so that each of the hyperlinks 204A-204Z may be associated with one or more annotations 210A-210Z. In one implementation, the one or more annotations 210A-210Z may include keywords indicating the nature of the videos linked to hyperlinks 204A-204Z. In another implementation, the one or more annotations 210A-210Z may include tags indicating that videos linked by hyperlinks 204A-204Z belong to pre-specified categories. The annotated video contents 206 may be ready to be searchable using annotations and consumed by users of the content sharing platform 108 through client devices and network.

Implementations of the present disclosure may include methods that use deep learning architectures for generating annotations for raw video contents. In an implementation, the deep learning architectures may include a convolutional neuron network (CNN) that may be trained directly on pixel intensities contained in video frames of video contents. Compared to feature-based neuron network approaches, CNN systems that directly analyze pixels may have the advantage of ease to generate a large amount of training data and more robust results. CNN systems implemented according to aspects of this disclosure may also have the advantage of flexibility to scale in spatial and temporal dimensions. Since the CNN systems work directly on pixels, they may use kernels and windows of weights of different sizes as the resolution and precision permit. Because of this flexibility of scaling, implementations may be customized to specific needs and achieve the desired results faster.

Figure 3A:
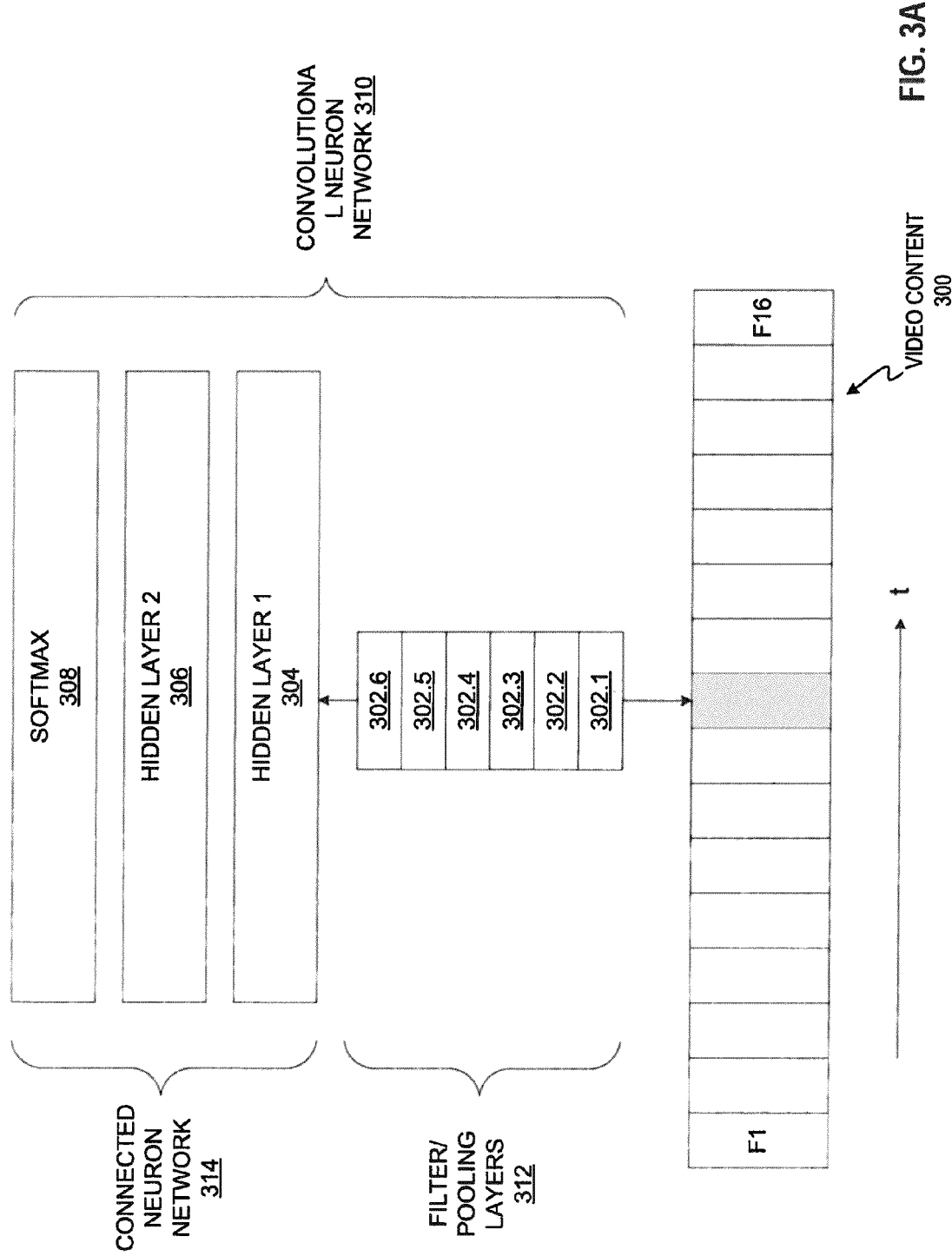

FIGS. 3A-3D illustrate different implementations of applying CNN systems to video contents (e.g., video clips) according to implementations of the disclosure. FIG. 3A illustrates the application of a convolutional neuron network 310 to a video clip 300 according to an implementation. The video content 300 may be a raw video clip including a stack of video frames (illustrated in FIGS. 3A-3D as F1-F16) temporally arranged along the t axis at a frame rate (such as 30 frames per second). Since the frame rate is fixed, the index to video frames indicates temporal dimension of the video frames. Each video frame may include a 2D array of pixels where each pixel may include one or more pixel intensity channels. For example, pixels of colored video contents may include three pixel intensities denoting red, green, and blue. Alternative color formats such as YUV may be derived from the RGB format. Pixels, of black and white video contents, may include one channel representing grey levels.

CNN 310 that processes video content 300 may include a first component of filter and/or pooling layers 312 and a second component of a connected neuron network 314. First component 312 may include a plurality of filter layers and pooling layers 302.1-302.6. Filter layers may convolve kernels with input data, and pooling layers may average and down sample the input data. Connected neuron network 314 may include hidden layers 304, 306, and a softmax layer 308. Parameters of hidden layers 304, 306 and softmax layer 308 may be trained on labeled training data so that the connected neuron network 314 may generate annotations from the outputs of filter/pooling layers 312.

In an implementation, as shown in FIG. 3A, the input data to the CNN system may be a single video frame of the video content. Therefore, the input data as a single video frame may include a 2D array of pixels which may undergo filter and/or pooling layers 302.1-302.6. The output of the filter and/or pooling layers 302.1-302.6 may be supplied to connected neuron network 314 to generate annotations associated with video content 300. In an implementation, the generated annotations may include a list of keywords ranked according to a likelihood value of a keyword being associated with the video content 300. For better results, parameters of hidden layers 304, 306, and softmax layer 308 are trained from singular video frames that were labeled with annotations.

CNN systems trained based on singular video frames, as shown in FIG. 3A, take into consideration only spatial information within a video frame but do not utilize the temporal correlation information between frames. When object movements are captured in a video clip, information about object movements may be captured in the form of temporal pixel correlation between nearby video frames. This correlational information may be encoded through a number of frames.

Figure 3B:
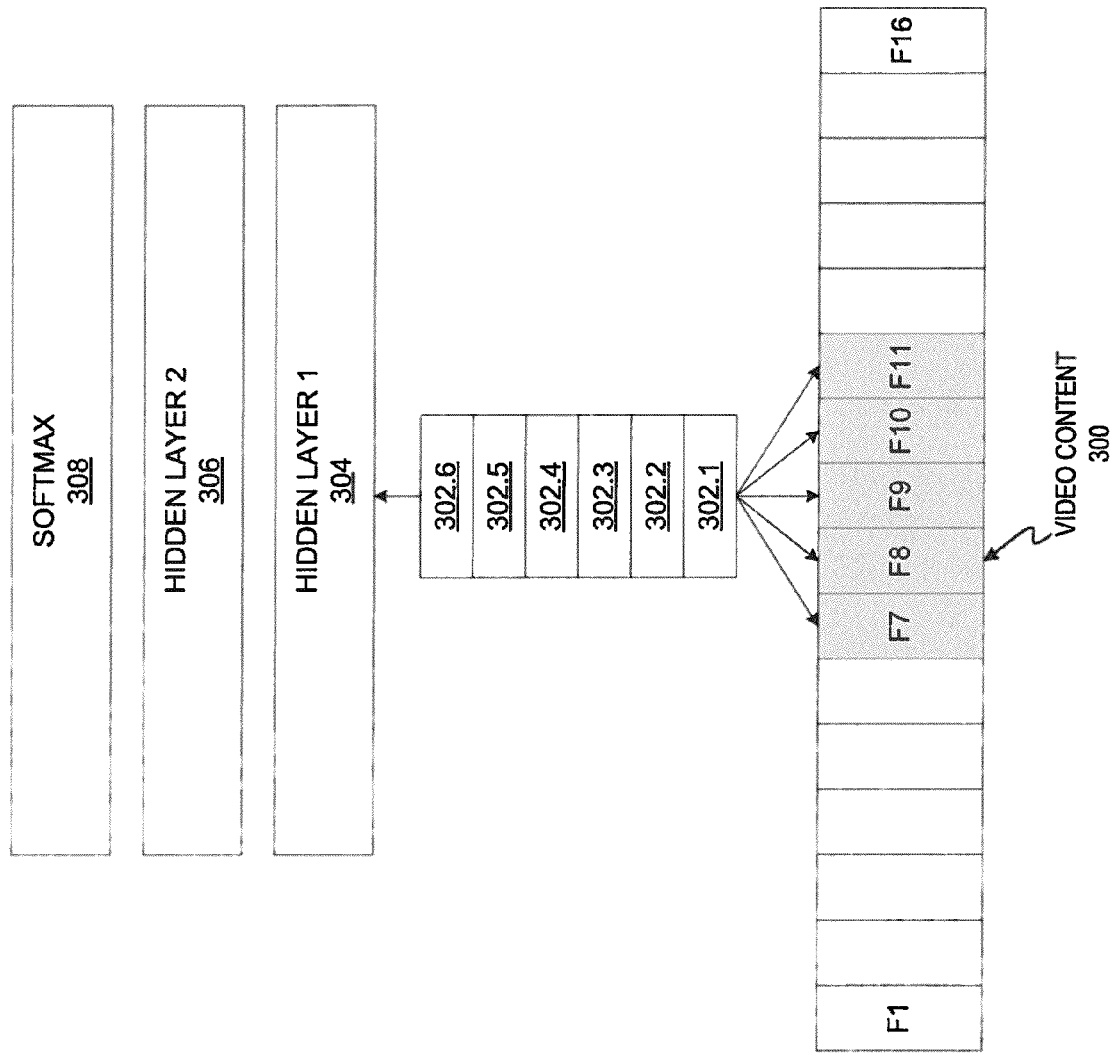

FIG. 3B illustrates an early fusion model that takes advantage of multiple video frames according to an implementation of the disclosure. Instead of a single video frame, a stack of temporally correlated video frames may be used as the input data to CNN systems. In an implementation, as shown in FIG. 3B, a stack of consecutively indexed video frames (e.g., frames F7-F11) may be used as input. Alternatively, temporally-correlated video frames may be stacked together as input. For example, every other frame such as frames F7, F9, F11 may be stacked together as input data to the CNN system 310. When video frames are stacked together, the input data may be viewed as a 3D data volume including spatial dimensions x and y, and temporal dimension t. Likewise, kernels in filter layers may also be 3D. In an implementation, the kernel may have dimensions of 3×3×3 for each pixel channel. Similarly, the weighted average operators for pooling layers may also be 3D. Outputs from filter and/or pooling layers 312 may be fed into a connected neuron network 314 to generate annotations for the video content 300. In an implementation, the generated annotations may include a list of keywords ranked according to a likelihood value of a keyword being associated with the video content 300. Parameters of the connected neuron network 314 may have been trained based on stacked video frames that had been previously labeled.

Figure 3C:
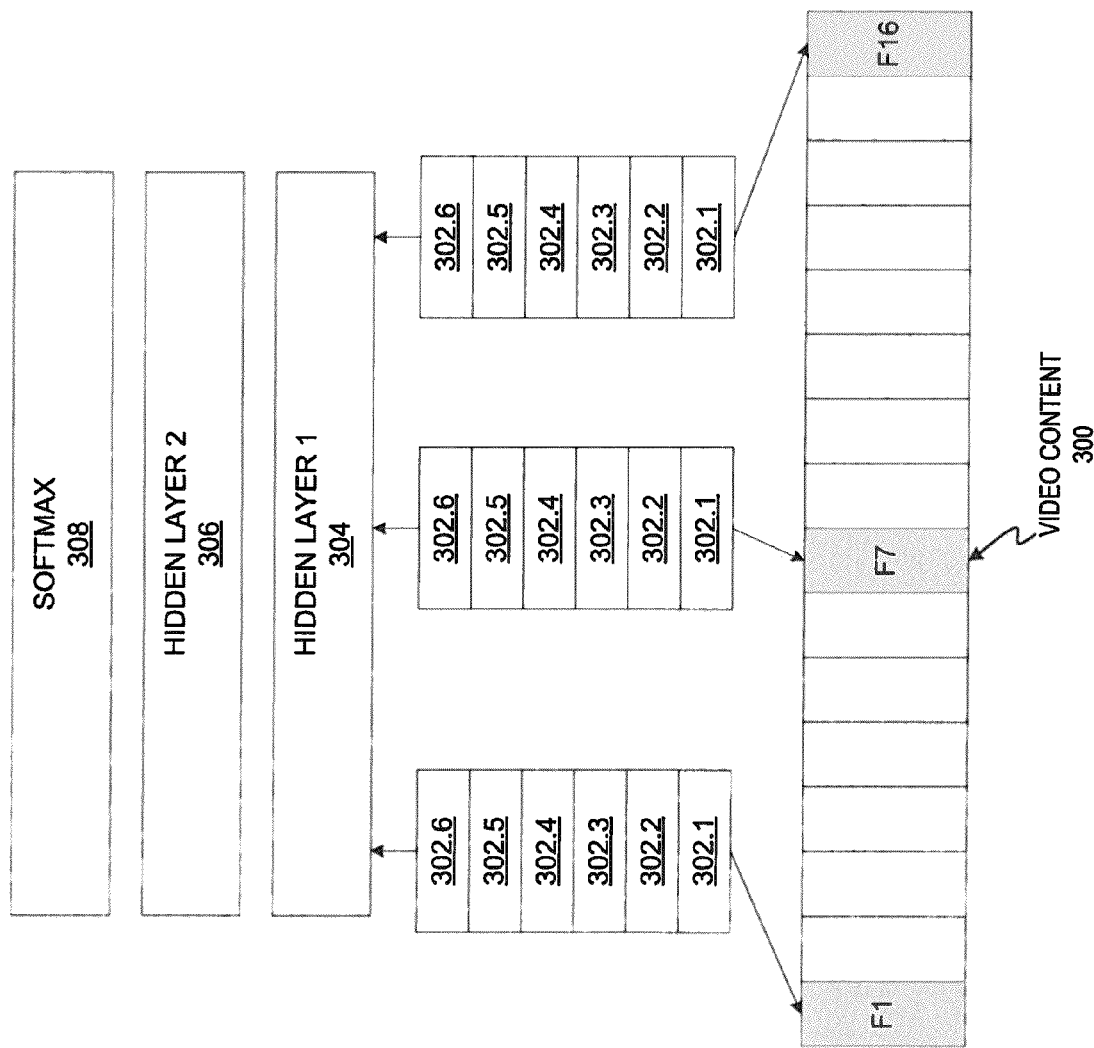

Rather than the early fusion of temporal correlation information, implementations of the disclosure may fuse the temporal information at late stages. FIG. 3C illustrates a late fusion model that takes advantage of multiple video frames according to an implementation of the disclosure. As shown in FIG. 3C, two or more non-consecutive video frames (e.g., frames F1, F7, F16) may be used as input. In addition, instead of processing a stack of video frames together, filter and/or pooling layers of the CNN system as shown in FIG. 3C process a number of video frames each individually, i.e., without taking into consideration their temporal correlation at the initial stage. Each of the video frames (e.g., F1, F7, F16) may undergo the same filter and/or pooling layers 302.1-302.6. The outcomes of each video frame F1, F7, F16, may be fed into the connected neuron network 314 for a late fusion that may then take into consideration temporal correlation among video frames F1, F7, F16.

Figure 3D:
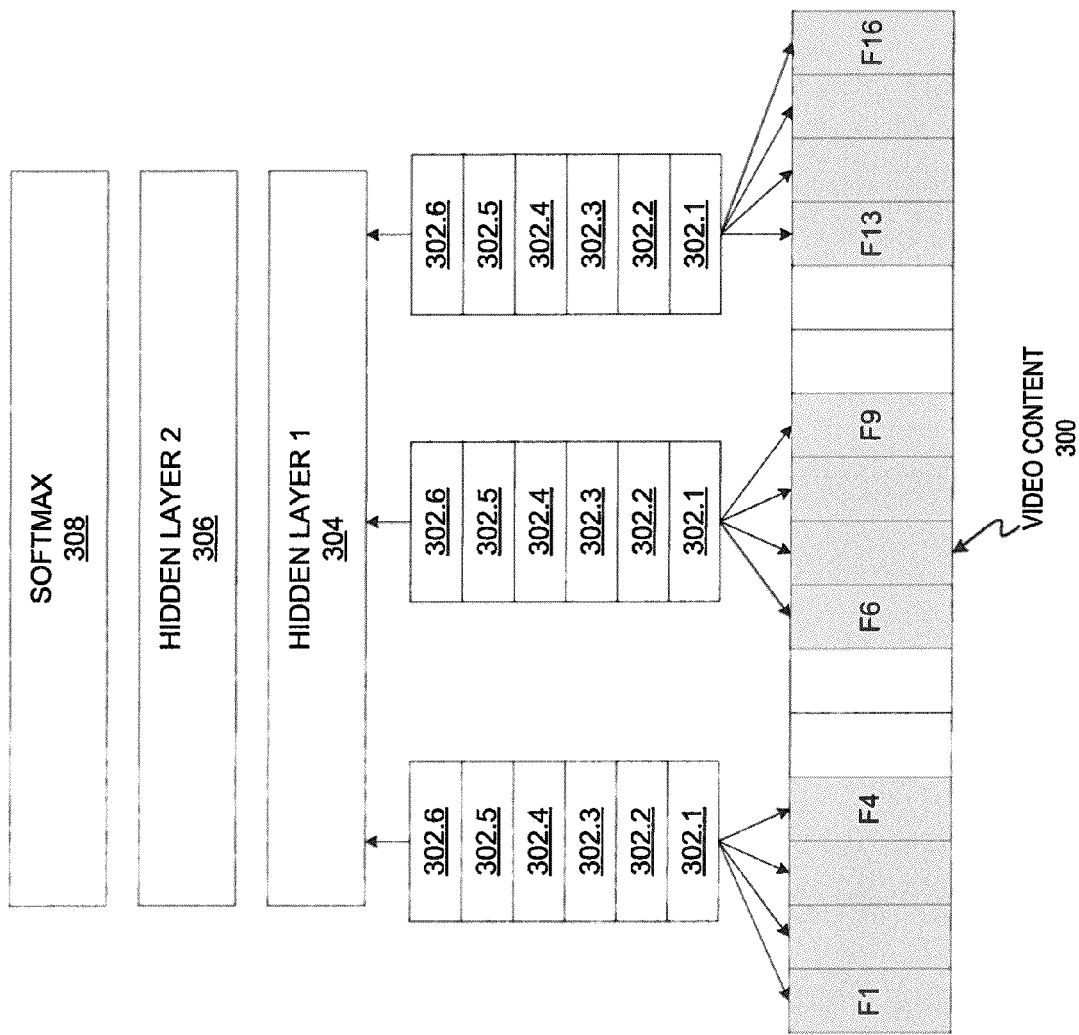

In one implementation, the early and late fusions may be combined together for form a hybrid fusion model. FIG. 3D illustrates a hybrid fusion model that combines early and late fusions according to an implementation of the disclosure. Similar to the early fusion model, video frames of video content 300 may be grouped into different groups. In one implementation, as shown in FIG. 3D, frames F1-F4 may be grouped into a first group, frames F6-F9 may be grouped into a second group, and frames F13-F16 may be grouped into a third group. Each group may be similarly processed by filter and pooling layers 302.1-302.6 in a manner similar to the early fusion model as shown in FIG. 3B. The outcomes from processing the three groups of video frames may be fed into the connected neuron network 314 to generate annotations for the video content 300. Parameters of the connected neuron network 314 may have been trained based on a combination of grouped video frames that had been previously labeled.

In one implementation, the fusion of temporal correlation among video frames may be developed progressively over layers of filter and pooling so that higher layers may progressively gain access to more global information in both spatial and temporal dimensions. FIG. 3E illustrates a progressive fusion model according to an implementation of the present disclosure. As shown in FIG. 3E, filter and/or pooling layers may be applied to video frames contained in video content 300. Lower layers or the first level layers may include groups of layers 302.1, 302.2 that may have a larger temporal extent. For example, each group of layers 302.1, 302.2, as shown in the example implementation of FIG. 3E, may have a temporal extent T=4 and a stride ST=2. Thus, each group of the first level of filter and/or pooling layers 302.1, 302.2 may cover four video frames. A middle layer or the second level layers may include layers 302.3, 302.4 that may have a smaller temporal extent. For example, layers 302.3, 302.4, as shown in the example implementation of FIG. 3E, may have a temporal extent T=2 and a stride ST=1. Thus, each group of the second level of filter and/or pooling layers 302.3, 302.4 may cover six video frames. The higher layer of the third level of filter may include layers 302.5, 302.6 that may have a temporal extent T=2 and a stride ST=0, and cover all eight video frames. In this way, the temporal correlation information is progressively incorporated through filter and/or pooling layers 302.1-302.6. The outcome of the progressive fusion of video frames may be fed into the connected neuron network 314 to generate annotations for video content 300.

As discussed in conjunction with FIG. 3E, the convolution layer and the pooling layer at a lower level may be applied to a first number of video frames while the convolution layer and a second pooling layer at a higher level may be applied to a second number of video frames. For example, at the lower level, the convolution layer and the pooling layer may be applied to four video frames while at the higher level, they may cover six video frames.

Figure 4:
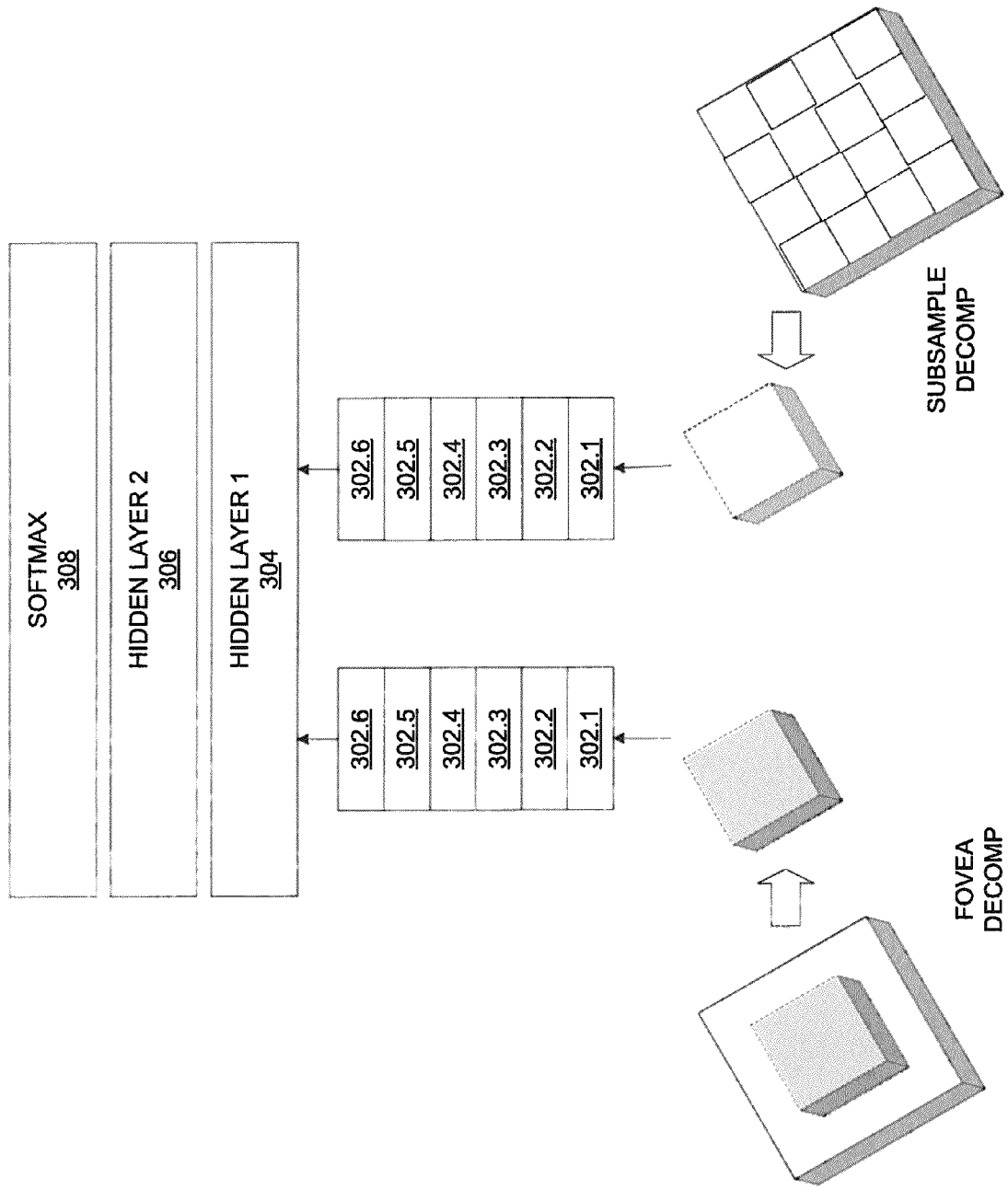
FIG. 4 is a bi-channel model using CNN according an implementation of the disclosure.

Implementations discussed so far have viewed the input to CNN systems as a whole frame. The whole video frame may include a large array of pixels such as an array of 170×170 pixels that require a lot of computational time to train the CNN. To reduce the computational burden while still achieving good annotation results, the video frames may be decomposed into different components. Each of the decomposed components may then be analyzed by the CNN. FIG. 4 illustrates an example decomposition of the input video frames according to an implementation of the disclosure. In an implementation, the first decomposition component is a fovea representation that is a central region cropped from each video frame contained in video content 300. The size of the fovea representation may be much smaller than that of the whole video frame. Since videos are typically shot such that actions are taken in the middle of video frames to grab viewer's attention, the small fovea regions still include rich motion information. The second decomposition component may include a spatial sub-sample of the video frames. In an implementation, every other pixel may be discarded so that the sub-sample component contains only one fourth of pixels contained in a whole video frame. In this way, the total number of pixels that need to be processed may be significantly reduced while information about the main characteristics of video frames is preserved.

As shown in FIG. 4, first and second decomposition components may be fed into a CNN system that may generate annotations for the video contents. The decomposed video frames may be processed in the manners similarly to those implementations described in FIGS. 3A-3E. Thus, each decomposition component may be treated as a single frame, early fusion, late fusion, hybrid fusion, and progressive fusion models. Parameters of the CNN may be trained according to these models as well.

Figure 5:
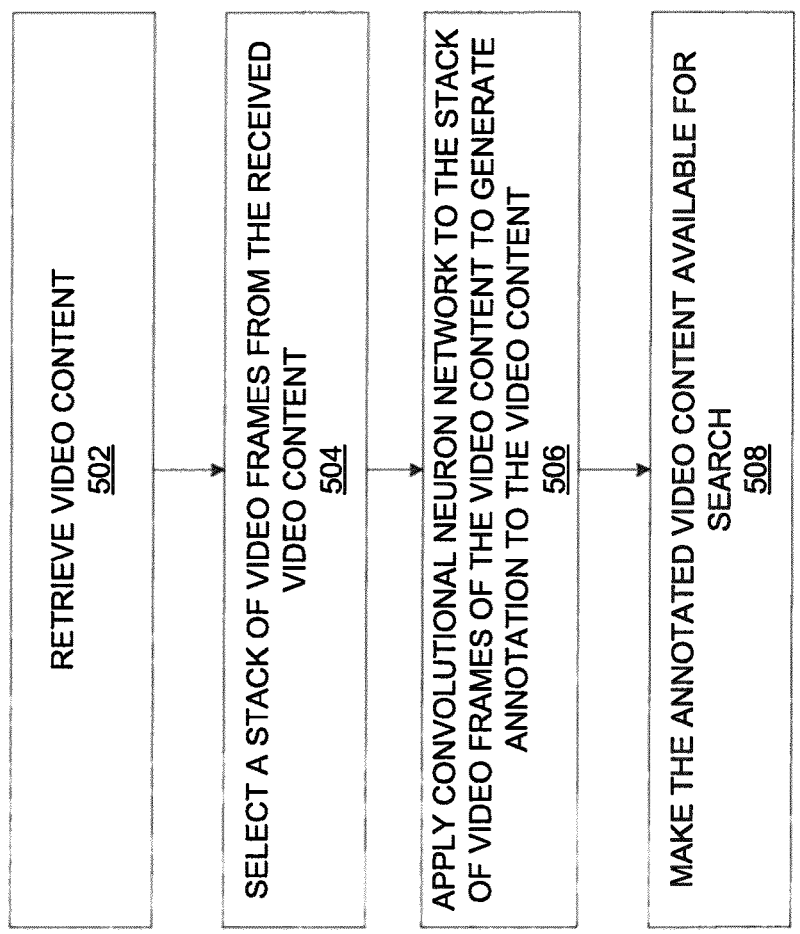
FIG. 5 illustrates a flow diagram of a method to perform annotating video content according to an implementation of the disclosure.
Figure 6:
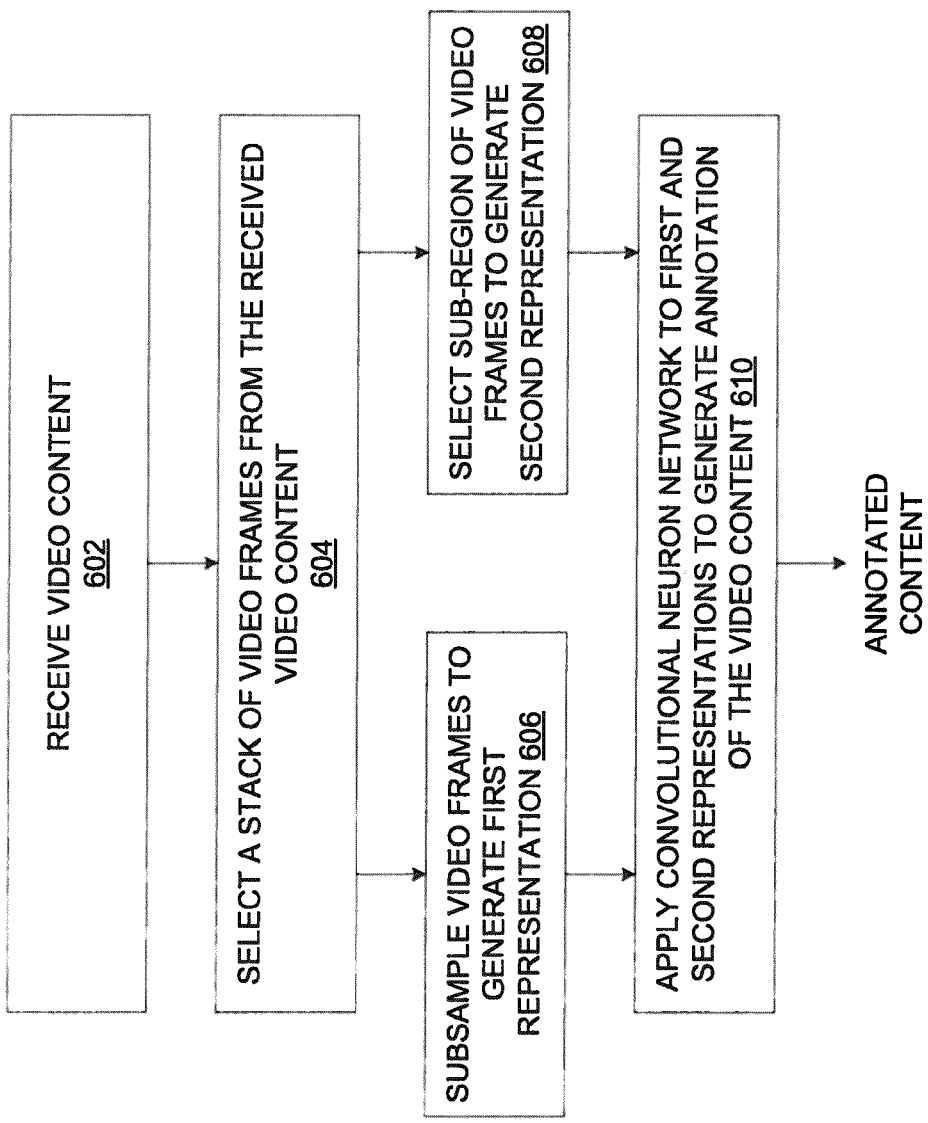
FIG. 6 illustrates a flow diagram of a method to perform annotating video content according to another implementation of the disclosure.

As discussed above, CNN systems can be used different implementations to annotate video content. FIGS. 5 and 6 illustrate flow diagrams of methods for annotating video content, according to some implementations of the disclosure. The method may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, the methods may be performed by annotation subsystem 112 as shown in FIGS. 1 and 2.

Referring to FIG. 5, at 502, the annotation subsystem 112 may retrieve a video content from a data store. The video content may include a plurality of video frames that are not associated with annotations. At 504, the annotation subsystem 112 may select a stack (or subset) of video frames from the video content. Depending of the model used, the stack may include one or more video frames. A single frame model may need one video frame, while other models as described above may need more than one video frame. At 506, the annotation subsystem 112 may apply a previously-trained convolutional neuron network to the stack of video frames to generate annotations for the video content. The CNN may be trained manually or automatically as discussed previously. The annotations may include a list of keywords associated with the video content. At 508, the annotation subsystem 112 may make the annotated video content available on a content sharing platform by associating keywords with a hyperlink of the video content.

FIG. 6 illustrates a flow diagram of a method to perform annotating video content according to another implementation of the disclosure. At 602, the annotation subsystem 112 may retrieve a video content from a data store. The video content may include a plurality of video frames that are not associated with annotations. At 604, the annotation subsystem 112 may select a stack (or subset) of video frames from the video content. Depending of the model used, the stack may include one or more video frames. The stack of video frames may then be decomposed into two components as discussed in the following 606, 608. At 606, the annotation subsystem 112 may spatially subsample video frames to generate a first representation of the video frames. In one implementation, the subsampling may be uniform across the spatial extent of the video frames. In another implementation, the subsampling may be random across the spatial extent of the video frames. The outcome of the sub sampling may be smaller than the original video frame. In other words, the number of pixels in the outcome is a small proportion of the number of original pixels. In one implementation, the number of pixels in the outcome is less than 25 percent of the original pixels.

At 608, the annotation subsystem 112 may also select a sub-region from video frames to generate a second representation of the video frames. The sub-region may be a small portion of the whole video frame. In an implementation, the sub-region may be one fourth of the original video frame while the sub-region has the same spatial sample rate as the video frame. Thus, the sub-region may include one fourth of pixels as the whole video frame. In an implementation, the select sub-region may be in the center of the video frame and is referred to as the fovea region. When multiple video frames are stacked up, the fovea region may include primary actions of the video. In an alternative implementation, the sub-region may be located at a non-central location. At 610, the annotation subsystem 112 may apply a convolutional neuron network to the first and second representations of the video frames, respectively, to generate annotations for the video content. Different models as described in FIGS. 3A-3E may be utilized in CNN systems. In one implementation, the first and second representations are derived from a single video frame. In other implementations, the first and second representations are derived from a plurality of video frames so that the early fusion, late fusion, hybrid fusion, and progressive fusion models as described in FIGS. 3B-3E may be used. The annotated videos generated from implementations of the disclosure may be made available on a content search platform for consumers to consume.

Figure 7:
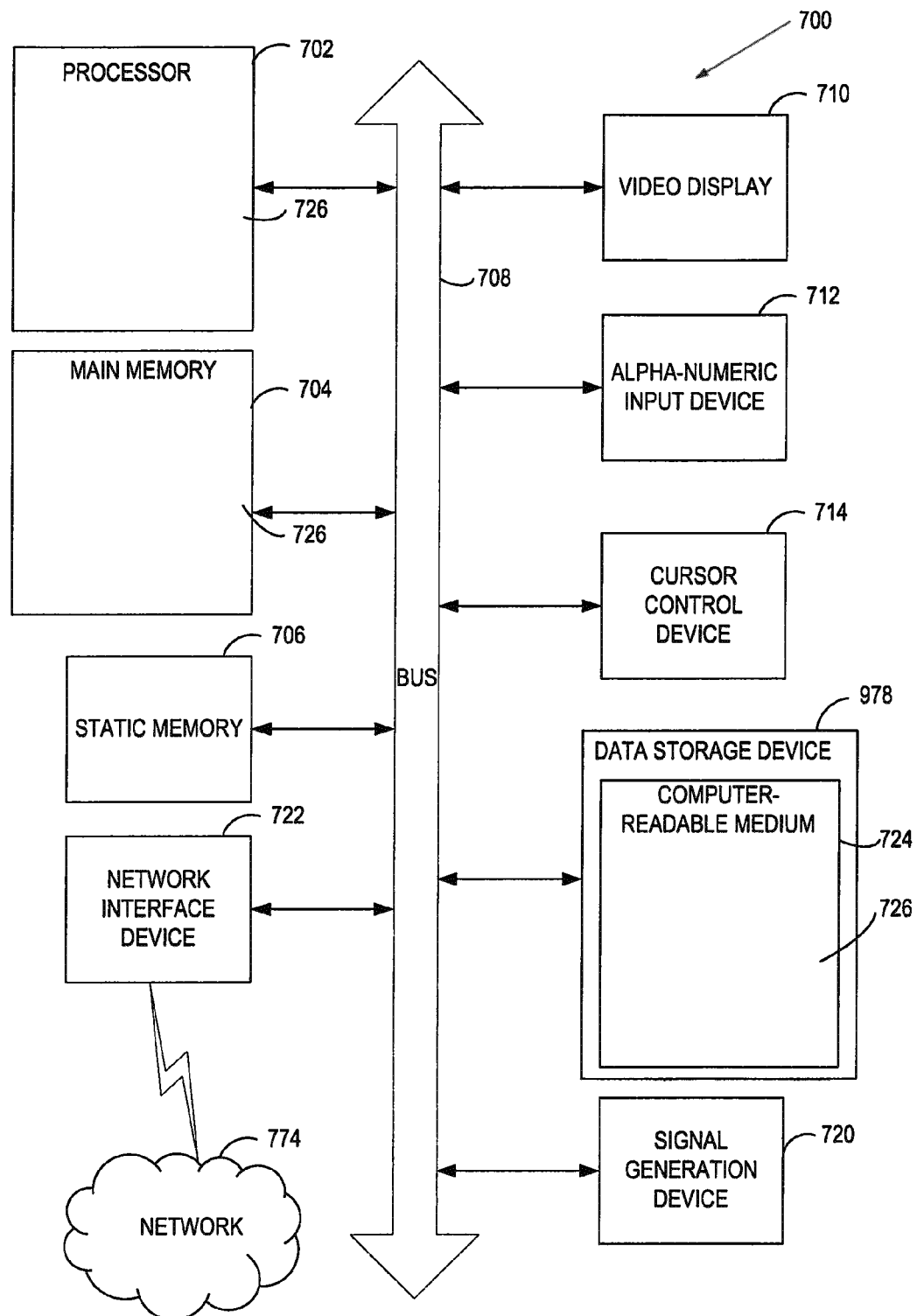
FIG. 7 is a block diagram illustrating an exemplary computer system, according to some implementations of the disclosure.

FIG. 7 illustrates a diagrammatic representation of a machine in the exemplary form of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD), a cathode ray tube (CRT), or a touch screen), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein (e.g., instructions of the annotation subsystem 112). The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 722.

While the computer-readable storage medium 724 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "segmenting", "analyzing", "determining", "enabling", "identifying," "modifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    receiving, by a processing device of a content sharing platform, a video content;
    selecting at least one video frame from the video content, wherein the at least one video frame covers a spatial area at a first resolution;
    subsampling the at least one video frame to generate a first representation of the at least one video frame, wherein the first representation is at a second resolution that is lower than the first resolution;
    selecting, at the first resolution, a sub-region of the at least one video frame to generate a second representation of the at least one video frame, wherein the sub-region covers a spatial area that is smaller than the spatial area covered by the at least one video frame; and
    executing a convolutional neuron network, using the first representation as a first input of the convolutional neuron network and using the second representation as a second input of the convolutional neuron network, to generate an annotation for the video content.

2. The method of claim 1, wherein the second representation is a fovea representation that is at a same spatial sampling rate as the at least one video frame.

3. The method of claim 1, wherein the at least one video frame is a single frame.

4. The method of claim 1, wherein the at least one video frame includes one of two consecutive video frames or at least two non-consecutive video frames.

5. The method of claim 1, wherein the convolutional neuron network includes at least one convolution layer, at least one pooling layer, and a connected neuron network.

6. The method of claim 5, wherein a first convolution layer and a first pooling layer are applied to a first number of video frames, and a second convolution layer and a second pooling layer are applied to a second number of video frames, and wherein the first number is different from the second number.

7. The method of claim 5, wherein an earlier layer of the convolutional neuron network is applied to a higher number of video frames than a later layer of the convolutional neuron network.

8. The method of claim 1, further comprising making the video content searchable according to the annotation.

9. A non-transitory machine-readable storage medium storing instructions which, when executed, cause a processing device to perform operations comprising:
    receiving a video content;
    selecting at least one video frame from the video content, wherein the at least one video frame covers a spatial area at a first resolution;
    subsampling the at least one video frame to generate a first representation of the at least one video frame, wherein the first representation is at a second resolution that is lower than the first resolution;
    selecting, at the first resolution, a sub-region of the at least one video frame to generate a second representation of the at least one video frame, wherein the sub-region covers a spatial area that is smaller than the spatial area covered by the at least one video frame; and
    executing a convolutional neuron network, using the first representation as a first input of the convolutional neuron network and using second representation as a second input of the convolutional neuron network, to generate an annotation for the video content.

10. The machine-readable storage medium of claim 9, wherein the second representation is a fovea representation that is at a same spatial sampling rate as the at least one video frame.

11. The machine-readable storage medium of claim 9, wherein the at least one video frame is a single frame.

12. The machined-readable storage medium of claim 9, wherein the at least one video frame includes one of at least two consecutive video frames or at least two non-consecutive video frames.

13. The machine-readable storage medium of claim 9, wherein the convolutional neuron network includes at least one convolution layer, at least one pooling layer, and a connected neuron network.

14. The machine-readable storage medium of claim 11, wherein a first convolution layer and a first pooling layer are applied to a first number of video frames, and a second convolution layer and a second pooling layer are applied to a second number of video frames, and wherein the first number is different from the second number.

15. A system comprising:
    a memory; and
    a processor, operatively coupled to the memory, to:
        receive a video content;
        select at least one video frame from the video content, wherein the at least one video frame covers a spatial area at a first resolution;
        subsample the at least one video frame to generate a first representation of the at least one video frame, wherein the first representation is at a second resolution that is lower than the first resolution;
        select, at the first resolution, a sub-region of the at least one video frame to generate a second representation of the at least one video frame, wherein the sub-region covers a spatial area that is smaller than the spatial area covered by the at least one video frame; and
        execute a convolutional neuron, using the first representation as a first input of the convolutional neuron network and using the second representation as a second input of the convolutional neuron network, to generate an annotation for the video content.

16. The system of claim 15, wherein the second representation is a fovea representation that is at a same spatial sampling rate as the at least one video frame.

17. The system of claim 15, wherein the convolutional neuron network includes at least one convolution layer, at least one pooling layer, and a connected neuron network.

18. The user device of claim 17, wherein a first convolution layer and a first pooling layer are applied to a first number of video frames, and a second convolution layer and a second pooling layer are applied to a second number of video frames, and wherein the first number is different from the second number.

* * * * *